Patented Nov. 29, 1949

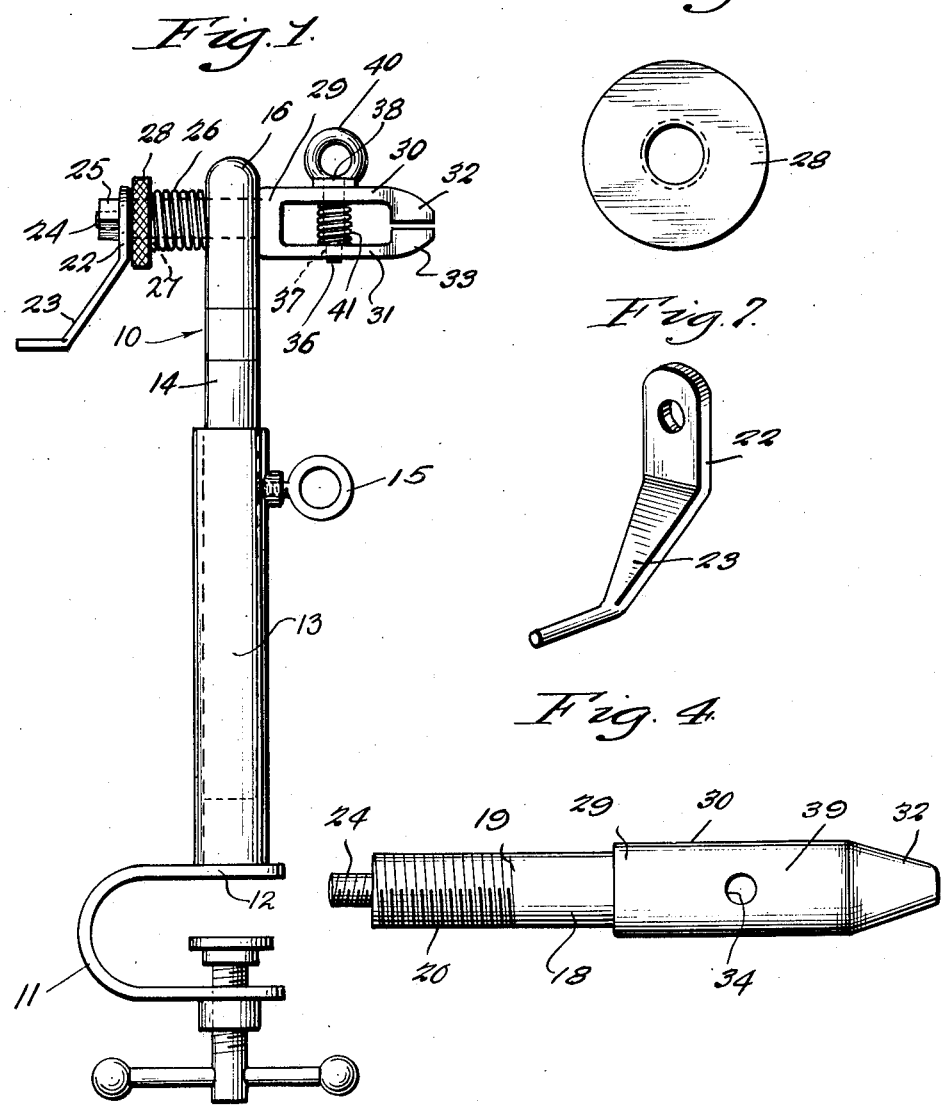

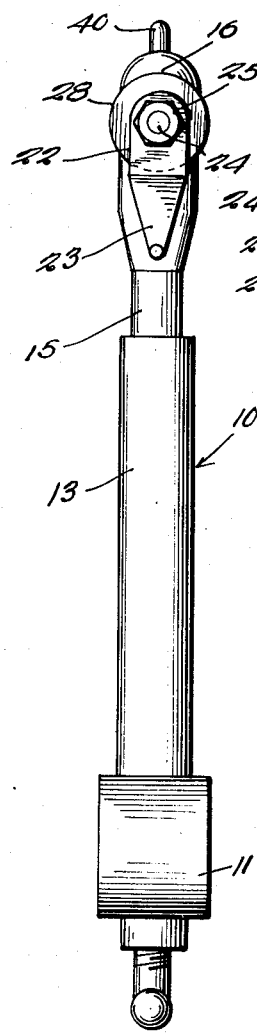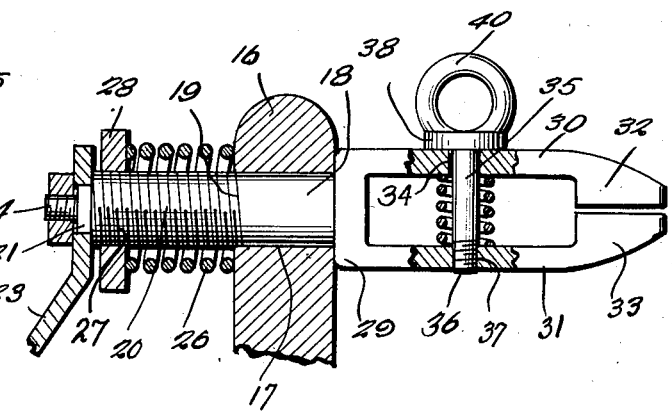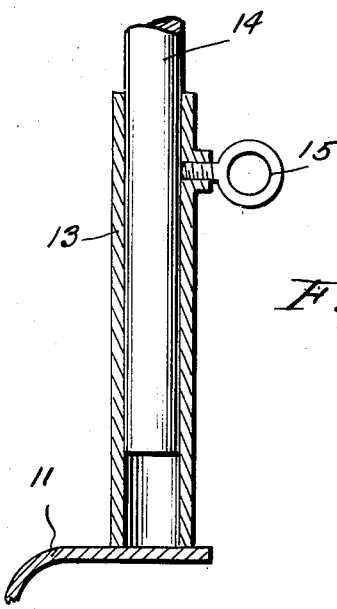

2,489,547

UNITED STATES PATENT OFFICE 2,489,547

LURE WINDING DEVICE

John R. Temple, Sebastopol, Calif.

Application February 9, 1945, Serial No. 577,068

6 Claims. (Cl. 242—7)

This invention relates to fishing tackle and has for its object to provide a simple device through the means of which fish lures or flies may be easily and expeditiously formed.

Another object of the invention is to provide a rotatable vise.

A further object of the invention is to provide a rotatable crank operated vise.

A still further object of the invention is to provide a vise having screw operated and spring releasing jaws.

Other features and advantages will become more readily apparent from the following description and the accompanying illustrative drawings in which:

Figure 1 is an elevational view of my invention,

Figure 2 is another elevational view thereof,

Figure 3 is an enlarged sectional elevation of the vise proper,

Figure 4 is a top plan view of the vise,

Figure 5 is a broken away sectional view of the vise support,

Figure 6 is a detail view of the lock nut, and

Figure 7 is a detail perspective view of the crank handle.

It may be observed that experienced fishermen and sportsmen often prefer to make their lures according to their own ideas rather than to use commercial lures, because their experience has taught them the character of lure with which they have the best luck and the character of lure most attractive to the various varieties of fish. Heretofore it has been common practice with the sportsmen to hold a fish hook in one hand and apply and wind the lure to the hook with the other hand. This being a slow, awkward and tedious process I have endeavored to rectify the same through means of this lure winding device illustrated in the accompanying drawings and described in the following specification in which like characters of reference indicate like parts throughout and in which 10 represents my complete lure winding device.

The invention includes a bench or table clamp 11, of a well-known type, and to the upper jaw 12, thereof is fixed a tube 13, into which a post 14, is telescopically seated and adjustably secured therein by means of a set screw 15, operating through a threaded bore in the member 13.

The head 16, of post 14, is provided with a transverse bore 17, through which the smooth cylindrical portion 18, of a shaft 19, is rotatably mounted, beyond which portion 18, the shaft is screw threaded as indicated at 20. Outwardly of said threaded portion the shaft is reduced as at part 21, to receive the bored head 22, of a crank handle 23, and beyond the part 21, the shaft is again reduced in diameter and screw threaded; at 24, to receive the nut 25, by means of which said crank is fixed in place. Coiled around the outer part 20, of the shaft 19, is a spring 26, which bears against said head 16, and against the outer end 27, of which a knurled nut 28, bears.

The forward outer end 29, of member 18, is enlarged and bifurcated to form opposing jaw arms 30 and 31, the outer terminals of which are enlarged to form offset gripping ends or slightly spaced apart jaws 32 and 33, between which a fish hook (not shown) may be clamped. The arm 30, is provided with a smooth bore 34, to receive a clamp pin 35, the lower end 36, of which is threaded into a threaded bore 37, provided in the arm 31, in vertical alignment with said bore 34. The pin 35, is provided with an enlarged head 38, to bear against the outer surface 39, of said arm 30, whereby when a tool (not shown) is projected through the eye 40, of the pin 35, and the pin rotated in one direction the screw end 36, will draw arm 31, toward arm 30, against the tension of the spring 41, coiled around the pin and close said jaws 32 and 33, upon the fish hook and securely hold the same while a lure is being attached thereto and tied with a thread, which may then be wound upon the lure and hook shank by turning the crank 23. When this operation is completed and it is desired to hold the shaft 19, from further rotation, the nut 28, is screwed against the spring 26, collapsing it tightly against one side of the head 16, and at the same time drawing the enlargement 29, against the opposite side of head 16, whereby the vise member will be held into tight frictional engagement with said head and thus prevented from rotation. After the thread is finally secured, it will only be necessary to reverse pin 35, whereupon the spring 41, will force jaws 32 and 33 apart. In order to adjust the tension of spring 26, it is merely necessary to rotate the crank 23 which will cause a rotation of the shaft 19 and since the nut 28 is resiliently held against rotation by the spring 26, the shaft 19 can be adjusted relative to the said nut 28.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention, that which I claim as new and desire to procure by Letters Patent is:

1. In a device as described a vise having a rotatable shaft, a post with a bore to receive the shaft, a screw for clamping the jaws of the vise and a spring on the screw for releasing the jaws, means for rotating the vise and means for holding it against rotation, said last means including a spring coiled upon the shaft, and a nut threaded on the shaft, and a tube into which said post is telescopically adjustable.

2. The described device comprising a vise having integrally connected jaws and a screw connecting the jaws whereby they may be clamped together, means for normally spreading the jaws, a vertical post for supporting the vise, a shaft integral with the vise and operating rotatably through a bore in the post, means for holding the vise against rotation, means whereby it may be rotated, a supporting tube into which the post is telescopic, and means for clamping the tube to a support.

3. The described device comprising a vise having integrally connected jaws and a screw connecting the jaws whereby they may be clamped together, means for normally spreading the jaws, a vertical post for supporting the vise, a shaft integral with the vise and operating rotatably through a bore in the post, means for holding the vise against rotation, means whereby it may be rotated, and a supporting tube into which the post is telescopic.

4. The described device comprising a vise having integrally connected jaws provided with offset gripping ends and a screw connecting the jaws whereby they may be clamped together, means for normally spreading the offset gripping ends, a vertical post for supporting the vise, a shaft integral with the vise and operating rotatably through a bore in the post, means for holding the vise against rotation, means whereby it may be rotated, and a supporting tube into which the post is telescoped.

5. The combination of claim 4 wherein said means for holding the vise against rotation includes a nut receivably engaged on the shaft, and a coil spring mounted on the shaft and biased between the nut and the post.

6. The combination of claim 4 wherein said last mentioned means includes a finger gripping crank handle detachably secured to the shaft.

JOHN R. TEMPLE.

REFERENCES CITED

The following references are of record in the file of this patent:

UNITED STATES PATENTS

| Number | Name | Date |
|---|---|---|
| 1,034,758 | Borchardt | Aug. 6, 1912 |
| 1,776,281 | Elliott | Sept. 23, 1930 |
| 2,332,655 | Miles | Oct. 26, 1943 |

FOREIGN PATENTS

| Number | Country | Date |
|---|---|---|
| 250,049 | Great Britain | Apr. 8, 1926 |